Figure 2:
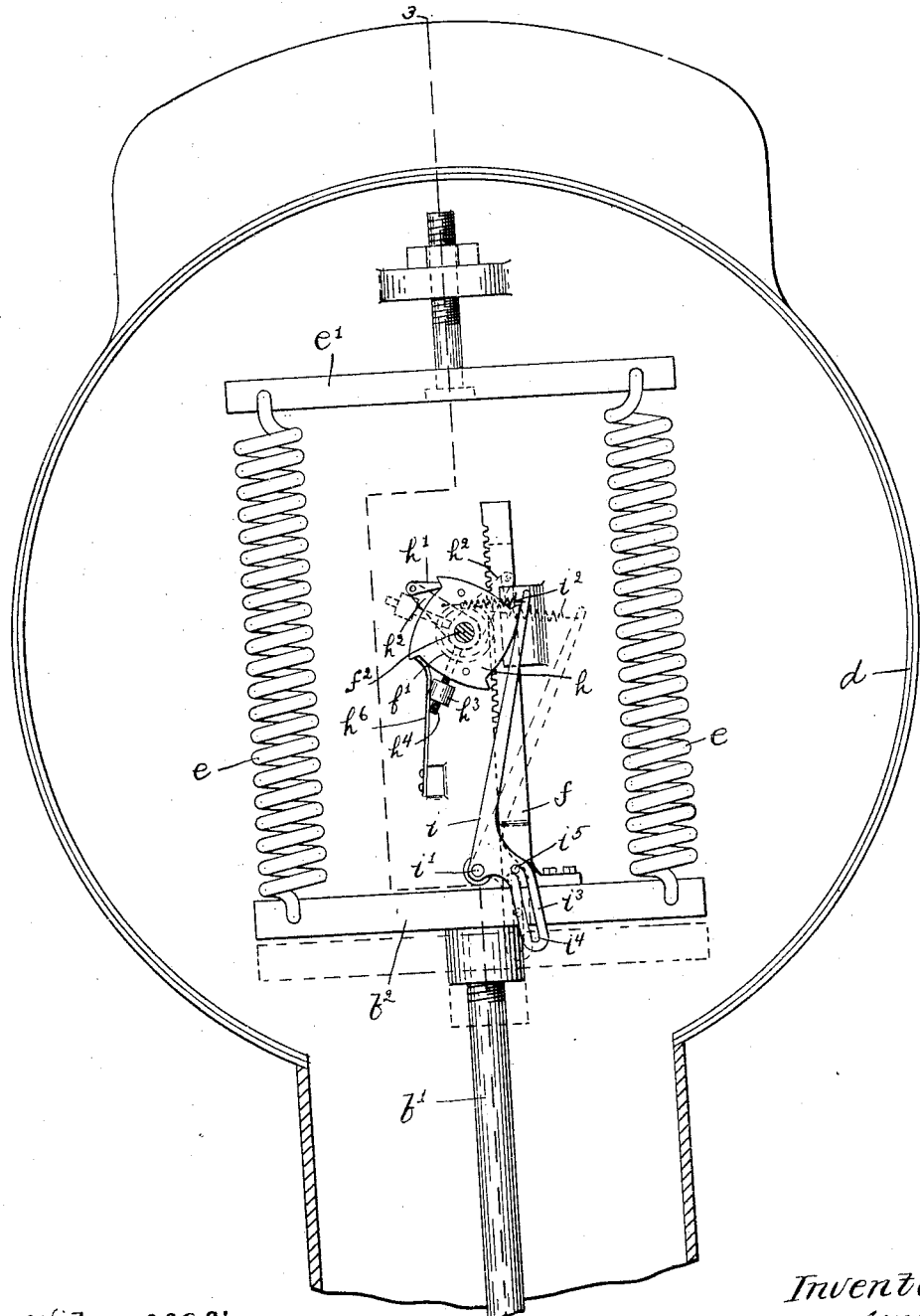

No. 859,223.  
PATENTED JULY 9, 1907.
R. G. HOWARD.  
CHANGEABLE EXHIBITOR.  
APPLICATION FILED NOV. 6, 1905. RENEWED DEC. 21, 1906.
2 SHEETS—SHEET 1.
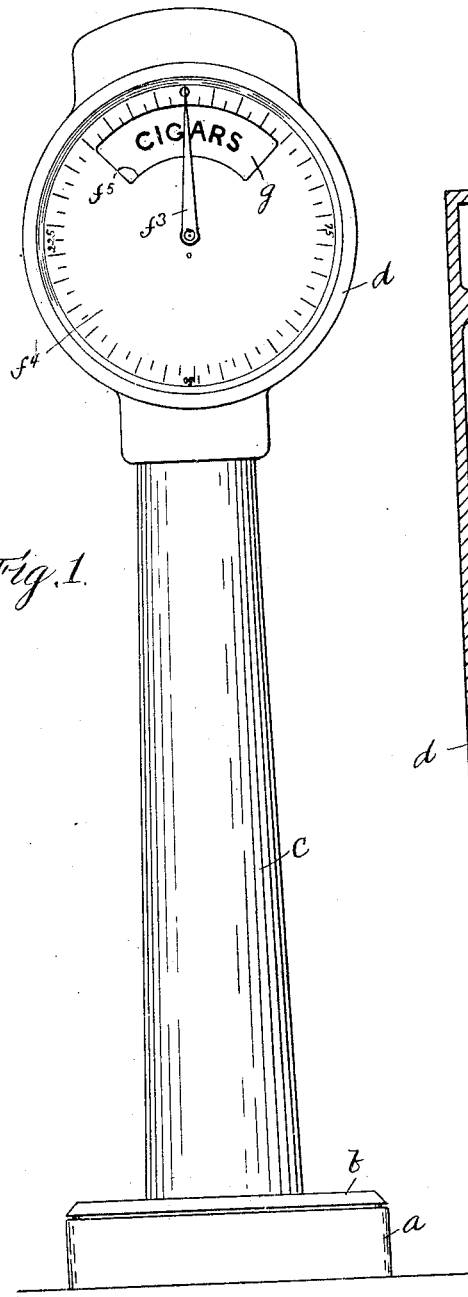
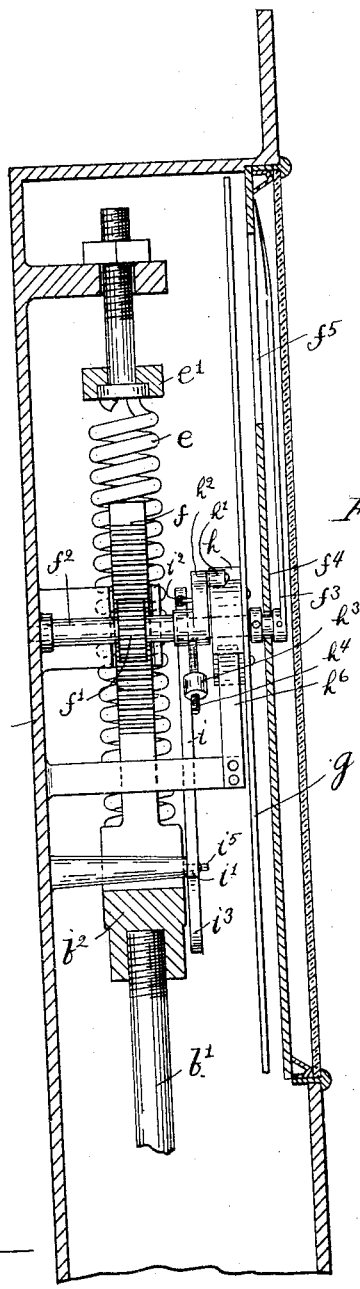
Witnesses:
H. B. Davis.
E. J. Meehan.
Inventor:
Robert G. Howard
By Noyes & Harriman
Attys.

UNITED STATES PATENT OFFICE.

ROBERT G. HOWARD, OF NEWTON, MASSACHUSETTS.

CHANGEABLE EXHIBITOR.

No. 859,223.

Specification of Letters Patent.

Patented July 9, 1907.

Application filed November 6, 1905. Renewed December 21, 1906. Serial No. 348,872.

*To all whom it may concern:*

Be it known that I, ROBERT G. HOWARD, of Newton, county of Middlesex, State of Massachusetts, have invented an Improvement in Changeable Exhibitors, of which the following description, in connection with the accompanying drawings, is a specification, like characters on the drawings representing like parts.

This invention relates to changeable exhibitors, and has for its object to construct a changeable exhibitor adapted to be applied to a weighing machine, and to be operated by a person mounting the platform of the machine to bring different exhibits or advertisements to view, or to display a different exhibit or advertisement each time the platform is depressed.

My invention comprehends the employment of means connecting an exhibiting device with the movable platform of a weighing machine, whereby whenever said platform is depressed by a weight upon it, as for instance, to operate the indicating device of the said machine, the exhibiting device will be operated, said connecting means preferably being in part elastic to obviate too suddenly moving the exhibiting device by the sudden depression of the platform.

Figure 1 shows in front elevation a changeable exhibitor embodying this invention applied to a weighing machine which is essentially of ordinary construction. Fig. 2 is an enlarged front elevation of the head of the machine, the dial plate and exhibiting disk being removed to expose the operating parts. Fig. 3 is a vertical section of the head of the machine taken on the dotted line 3—3, Fig. 2.

$a$ represents the base of the machine, $b$ the movable platform, $c$ a column rising from the base $a$ which contains the platform rod $b'$, and $d$ a circular or other shaped head which is mounted on the column $c$ and which contains the operating parts. The platform rod $b'$, is connected at its upper end to a frame $b^2$ to which the lower ends of the weighing or other supporting springs $e$, $e$, are attached, and the upper ends of said springs are attached to a cross bar $e'$ which is adjustably supported at the top of the head $d$. A rack bar $f$ is formed upon or erected on the frame $b^2$, which extends upward and its teeth engage a pinion $f'$ secured to a shaft $f^2$, having its bearings centrally disposed in the head $d$. An indicator hand or pointer $f^3$ is secured to the shaft $f^2$ which moves over a dial plate $f^4$, set in the front of the head $d$.

The mechanism thus far described is common in weighing machines and is herein shown merely for the sake of illustrating my invention, and I desire it to be understood that my invention comprehends the employment of any other equivalent form of weighing mechanism by which the weight of the person standing on the movable platform may be indicated, or any other form of spring supported or spring balanced or movable platform which is adapted to be depressed by the weight of a person standing upon it.

The exhibiting device consists essentially of a disk $g$ mounted on the shaft $f^2$ back of the dial plate $f^4$, said disk having secured to or printed upon or otherwise provided thereon any number of exhibits or advertisements. The exhibits or advertisements are displayed through an opening $f^5$ in the dial plate $f^4$. A ratchet wheel $h$ is secured to or rigidly connected with said disk $g$, having any desired number of teeth, but preferably a number corresponding to the number of exhibits or advertisements on the disk, and said ratchet wheel is engaged by a pawl $h'$ pivoted to the extremity of an arm $h^2$, which is mounted to turn loosely on the shaft $f^2$. The pawl-carrying arm $h^2$ has a weight attached to it, which is herein shown as a block $h^3$, mounted on the screw threaded portion of an arm $h^4$, which is attached to the pawl-carrying arm $h^2$. $h^6$ represents a spring finger which engages the ratchet wheel and prevents backward rotation thereof. A lever $i$ is pivoted at $i'$ to the frame $d^2$ which extends upward and its upper end is connected by a spring $i^2$ with the pawl-carrying arm, and said lever has a downwardly extended portion or ear $i^3$, which is formed with a cam slot $i^4$, adapted to receive a pin $i^5$ projecting from the frame $b^2$. As the frame is moved downward, as by a person mounting the platform, the pin $i^5$ working in the slot $i^4$ moves the lever $i'$ on its pivot, and by means of the spring connection of said lever with the pawl-carrying arm, moves said arm to turn the ratchet-wheel and disk attached to or connected with it. The spring $i^2$ provides an elastic connection so that as a person steps onto the platform and thereby suddenly depresses it, such sudden movement will not be imparted to the disk $g$. The pin $i^5$ normally occupies a position at the upper end of the cam slot, and said slot is so formed that the pin acts to move the lever $i$ its full stroke during the first part of its travel along the slot. The pin, however, remains in the slot for the purpose of retaining its connection with the lever as the frame $b^2$ continues to descend, and subsequently permit of the return of the lever with the pin in engagement with it. By thus providing means for moving the lever on its pivot to operate the advertising-device on the first part only of the downward movement of the platform, I am enabled to cause the advertising-device to operate when a light weight is placed on the platform as well as a heavy weight, thereby insuring the operation of the advertising-device under all ordinary conditions. The form of exhibiting device, as herein shown, is simple and capable of displaying quite a number of exhibits or advertisements, but I desire it to be understood that my invention comprehends the employment of any other form of exhibiting device in lieu of the form herein shown; and furthermore my invention comprehends the employment of any other means for operating the exhibiting device which is adapted to be operated by a movable platform in lieu of the means herein shown.

Having thus described my invention, what I claim as new and desire to secure by Letters Patent is:—

1. In a changeable exhibitor, the combination of a movable platform, an exhibiting device, a pivoted actuating lever for said exhibiting device, having a cam slot, a pin working in said slot and a frame bearing said pin which is connected with said platform, substantially as described.

2. In a changeable exhibitor, the combination of an exhibiting disk, means for moving it step by step, a pivoted actuating lever for said means having a cam slot, a pin working in said slot, a frame bearing said pin, and a movable platform connected with said frame, substantially as described.

3. In a changeable exhibitor, the combination of an exhibiting disk, a ratchet wheel and pawl for moving it step by step, a pivoted lever connected with the pawl-carrying arm having a cam slot, a pin working in said slot, a frame bearing said pin and a movable platform connected with said frame, substantially as described.

4. In a changeable exhibitor, the combination of an exhibiting device, a ratchet wheel connected thereto, a pawl engaging said ratchet wheel, a pawl-carrying arm, a pivoted lever elastically connected with said pawl-carrying arm, a movable platform, and means connecting it with said pivoted lever for operating said lever upon the descent of the platform, substantially as described.

5. In a changeable exhibitor, the combination with an exhibiting disk, means for moving it step by step, a pivoted actuating lever therefor having a cam slot, a spring connecting said lever with the means for turning the disk, a pin working in said slot, a frame bearing it and a movable platform connected with said frame, substantially as described.

6. In a changeable exhibitor, the combination of an exhibiting device, a ratchet wheel connected thereto, a pawl engaging said ratchet-wheel, a pawl-carrying arm, a pivoted lever elastically connected with said pawl-carrying arm having a cam slot, a pin working in said slot, a frame bearing said pin and a movable platform connected with said frame, substantially as described.

7. In a changeable exhibitor, the combination of a dial having a display opening, an indicating hand, a platform, weighing springs, means connecting said platform with said weighing springs and also with said indicating hand, an exhibiting device back of said dial, and means for operating it step by step connected with and adapted to be operated by said platform, substantially as described.

8. In a changeable exhibitor, the combination of a dial having a display opening, an indicating hand, a platform, weighing springs; means connecting said platform with said weighing springs and also with said indicating hand, an exhibiting disk back of said dial, and means for moving it connected with and adapted to be operated by said platform, substantially as described.

9. In a changeable exhibitor, the combination of a stationary dial having a display opening, a movable indicating hand, a movable platform, and weighing springs, and means connecting said weighing springs and said indicating-hand with said platform, an exhibiting device having a plurality of exhibits, and a step-by-step device also connected with and operated by said platform, for operating said exhibiting device to successively bring the exhibits to view at the display opening, substantially as described.

10. In a changeable exhibitor, the combination of a dial having a display opening, an indicating hand, a pinion on the shaft bearing said hand, a rack engaging it, a vertically moving frame bearing said rack, weighing springs connected to said frame, a platform, a platform rod connecting said frame with the platform, an exhibiting device back of said dial, and means connected with and operated by said frame for operating said exhibiting device, substantially as described.

11. In a changeable exhibitor, the combination of an indicating device, a platform, a platform rod connected therewith, a vertically moving frame to which said platform rod is connected, weighing springs connected with said frame, means operated by said frame for operating the indicating device, an exhibiting disk, means for moving it step by step, a pivoted lever connected with the means for moving said disk having a cam slot and a pin on said frame working in said slot, substantially as described.

12. In a changeable exhibitor, the combination with a movable platform, weighing springs connected therewith, a stationary dial and an indicating hand moving over said dial which is connected with and operated by said platform, of an exhibiting-device having a plurality of exhibits, and means elastically connected with and operated by said platform, for operating it to successively display the exhibits, substantially as described.

13. In a changeable exhibitor, the combination of an indicating device, a platform, a platform rod connected therewith, a vertically moving frame to which said platform rod is connected, weighing springs connected to said frame, means operated by said frame for operating the indicating device, an exhibiting disk, means for moving it step by step, a pivoted lever elastically connected with the means for moving said disk having a cam slot and a pin on said frame working in said slot, substantially as described.

14. In a changeable exhibitor, the combination of an indicating device, a platform, a platform rod connected therewith, a vertically moving frame to which said platform rod is connected, weighing springs connected to said frame, means operated by said frame for operating the indicating device, an exhibiting device, a ratchet wheel and pawl for moving it step by step a pivoted lever connected with and operated by said frame and a spring connecting said lever with the pawl carrying arm, substantially as described.

15. In a changeable exhibitor, the combination of weighing-mechanism having counter-balancing means the force of which varies with the displacement of the platform, a platform connected thereto, which is movable downwardly different distances according to the weight which is placed upon it, an exhibiting-device having a plurality of exhibits and means, operated by said downwardly moving platform, for operating said exhibiting-device to display a different exhibit, substantially as described.

16. In a changeable exhibitor, the combination of weighing-mechanism having counter-balancing means the force of which varies with the displacement of the platform, a platform connected thereto, which is movable downwardly different distances according to the weight which is placed upon it, an exhibiting-device having a plurality of exhibits, a pivoted actuating lever for said exhibiting-device, and means, operated by said downwardly moving platform for moving said actuating-lever on its pivot to actuate the exhibiting-device to display a different exhibit, substantially as described.

17. In a changeable exhibitor, the combination of weighing-mechanism, a platform to which it is connected, adapted to move downward a predetermned distance, an exhibiting-device, actuating means therefor, a pivoted lever elastically connected with said actuating means, and means, operated by the platform during the first part of said downward movement, for moving said lever on its pivot to operate the actuating means for the exhibiting-device, substantially as described.

18. In a changeable exhibitor, the combination of a dial having a display opening, an indicating-hand, a platform adapted to move downward a predetermined distance, weighing-springs, means connecting said platform with said weighing-springs and also with said indicating-hand, an exhibiting-device back of said dial, and means, operated by said platform during the first part of said downward movement, for operating said exhibiting-device to display different advertisements, substantially as described.

19. In a changeable exhibitor, the combination of a stationary dial having a display opening, a movable indicating-hand, a platform adapted to move downward a predetermined distance, weighing-springs and means connecting said weighing-springs and said indicating-hand with said platform, an exhibiting-device having a plurality of exhibits, and means, operated by said platform during the first part of said downward movement, for operating said exhibiting-device to successively bring the exhibits to view at the display opening, substantially as described.

20. In a changeable exhibitor, the combination of a platform adapted to move downward a predetermined distance, weighing-springs connected therewith, a stationary dial, an indicating-hand moving over said dial which is operated by said platform, of an exhibiting-device having a plurality of exhibits, and means, operated by said platform during the first part of said downward movement for operating said exhibiting-device to successively display different exhibits, substantially as described.

In testimony whereof, I have signed my name to this specification, in the presence of two subscribing witnesses.

ROBERT G. HOWARD.

Witnesses:
B. J. NOYES,
H. B. DAVIS.